(12) United States Patent
Yeon et al.

(10) Patent No.: US 9,144,771 B2
(45) Date of Patent: Sep. 29, 2015

(54) IODINE ABSORBENT MATERIAL CONTAINING SALT AND RADIOACTIVE IODINE REMOVAL SYSTEM USING THE SAME

(71) Applicants: Korea Atomic Energy Research Institute, Daejeon (KR); Korea Hydro & Nuclear Power Co., Ltd, Daejeon (KR)

(72) Inventors: Jei-Won Yeon, Daejeon (KR); Sang Hyuk Jung, Nonsan-si (KR); Jong-Yun Kim, Daejeon (KR); Kyuseok Song, Daejeon (KR); Hee-Jung Im, Jeju-si (KR)

(73) Assignees: Korea Atomic Energy Research Institute, Daejeon (KR); Korea Hydro & Nuclear Power Co., Ltd., Daejeon (KR)

( * ) Notice: Subject to any disclaimer, the term of this patent is extended or adjusted under 35 U.S.C. 154(b) by 230 days.

(21) Appl. No.: 13/911,035

(22) Filed: Jun. 5, 2013

(65) Prior Publication Data

US 2013/0323149 A1 Dec. 5, 2013

(30) Foreign Application Priority Data

Jun. 5, 2012 (KR) .................. 10-2012-0060601
May 15, 2013 (KR) .................. 10-2013-0055370

(51) Int. Cl.
*B01D 53/68* (2006.01)
*G21F 9/02* (2006.01)

(52) U.S. Cl.
CPC ............. *B01D 53/685* (2013.01); *G21F 9/02* (2013.01); *B01D 2251/304* (2013.01); *B01D 2251/306* (2013.01); *B01D 2251/404* (2013.01); *B01D 2251/604* (2013.01); *B01D 2257/204* (2013.01)

(58) Field of Classification Search
CPC .................. B01D 2251/304; B01D 2251/306; B01D 2251/404; B01D 2251/604; B01D 2257/204; B01D 53/685; G21F 9/02
See application file for complete search history.

(56) References Cited

U.S. PATENT DOCUMENTS

2008/0171347 A1* 7/2008 Atassi .................. 435/7.92

FOREIGN PATENT DOCUMENTS

| JP | 05-126995 A | 5/1993 |
| JP | 08-071368 A | 3/1996 |

(Continued)

OTHER PUBLICATIONS

Office Action dated Sep. 30, 2014 of corresponding Korean Patent Application No. 10-2013-0055370—5 pages.

(Continued)

*Primary Examiner* — Christopher P Jones
(74) *Attorney, Agent, or Firm* — Knobbe Martens Olson & Bear, LLP

(57) ABSTRACT

An apparatus for filtering airborne radioactive iodine is provided. The apparatus includes a housing defining an interior space and comprising an inlet for receiving air and an outlet for discharging the air; and a composition placed in the interior space for trapping airborne radioactive iodine between the inlet and the outlet. The composition comprises one or more salts selected from the group consisting of an alkali metal chloride and an alkaline earth metal chloride. A method of filtering airborne radioactive iodine is further provided. The method includes providing the foregoing apparatus at a nuclear facility and blowing air to flow from the inlet to the outlet and contact the composition placed in the interior space, whereby airborne radioactive iodine is trapped in the interior space.

20 Claims, 2 Drawing Sheets

(56) References Cited

FOREIGN PATENT DOCUMENTS

| JP | 2003-302493 | A | 10/2003 |
|----|-------------|----|---------|
| JP | 4142341 | B2 | 6/2008 |
| JP | 2012-002606 | A | 1/2012 |
| KR | 10-0237429 | B1 | 1/2000 |
| KR | 2000-0008867 | A | 2/2000 |
| KR | 10-2004-0049860 | A | 6/2004 |

OTHER PUBLICATIONS

Jolley et al., "Iodine Adsorbent Poisoning FY-83 Report", EG&G Idaho, Inc., EGG-MS-6411, 1983 in 33 pages.

Faghihian et al., "Adsorption of radioactive iodide by natural zeolites", Journal of Radioanalytical and Nuclear Chemistry, 2002, vol. 254, No. 3, pp. 545-550.

Office Action dated Mar. 31, 2014 of corresponding Korean Patent Application No. 2013-0055370—5 pages.

* cited by examiner

IODINE ABSORBENT MATERIAL CONTAINING SALT AND RADIOACTIVE IODINE REMOVAL SYSTEM USING THE SAME

BACKGROUND

1. Field

The present disclosure relates to an iodine absorbent material containing a salt, and a radioactive iodine removal system using the same, and more particularly, to an iodine absorbent material applicable when volatile fission products are abnormally emitted from nuclear facilities, and a radioactive iodine removal system using the same.

2. Discussion of Related Technology

Radioactive iodine ($^{131}$I) is one of fission products formed as a fissile material undergoes nuclear fission, which is a radioactive isotope that accounts for approximately 2.8% of a total of fission products formed as uranium undergoes nuclear fission by means of thermal neutrons (fission yield: 2.8%). The molecular iodine of this element has a high level of radioactivity and exists as gas, and thus, the absorptiveness in human body by respiration is high, therefore is a nuclide whose initial spread is of particular concern when a nuclear accident takes place.

In general, iodine is present in the form of cesium iodide (CsI) in a spent nuclear fuel, and released to the outside in the CsI form. Since there is a high possibility that the first exposed environment would be the inner part of a coolant, a method of suppressing an oxidation reaction of iodide ($I^-$) into iodine ($I_2$). The released iodide ($I^-$) ion is stably dissolved in the coolant, but the molecular iodine ($I_2$) is volatile. In this background, a method of controlling a pH value of a coolant and redox conditions has been used for a long period of time. A level of volatility of the iodine present in an aqueous solution may be lowered by controlling the pH value of the coolant and the redox conditions as described above. However, the iodine is released into an internal atmosphere of a reactor containment building due to an increase in temperature of the coolant, or an increase in a level of volatility of the iodine under an environment exposed to radiation. Also, since the iodine easily reacts with organic compounds and increase a level of volatility while forming organic iodide, methods of minimizing contact with an organic compound have been used.

In general, a method of removing iodine released in the atmosphere includes a method using an absorbent material. A representative absorbent material includes a carbon-based absorbent material such as activated carbon (i.e., charcoal), and a silver.

J. G. Jolley and H. G. Tompkins from the US Idaho Falls Institute evaluated a level of absorption of various organic iodines at room temperature and a high-temperature desorption characteristic using silver zeolite. Also, H. Faghihian et al. (J. Radioanalytical and Nuclear Chemistry, (2002) 254: 545-550) disclosed that two kinds of natural zeolites (clinoptilolite and natrolite) may be used as a radioactive iodine absorbent by measuring a level of absorption of radioactive iodine into both of the natural zeolites. Japanese Patent Application Publication No. 2003-302493 (Oct. 24, 2003) discloses a method of fixing radioactive iodine gas using a silicate-based mineral having micropores, and Japanese Patent Application Publication No. Hei 5-126995 (May 25, 1993) discloses a method of separating an iodine species by precipitation by treating waste water containing radioactive iodine with silver nitrate. Also, Korean Patent Application Publication No. 2000-0008867 (Feb. 15, 2000) discloses a method of converting a chemical species of radioactive iodine in an aqueous solution or waste water into molecular iodine ($I_2$) to remove the chemical species from a gaseous phase to activated carbon.

As one of representative absorbent materials, a silver-based radioactive iodine absorbent material has two limits. First, since silver belongs to the group of noble metals, an absorbent material using silver is very expensive compared with its effects. Second, silver has high reactivity with iodine, but also exhibits high reactivity with chloride ions. Since many nuclear power plants are generally installed on the seashore, and salt aerosol is present at a high concentration in the atmosphere within several kilometers from the seashore. Accordingly, absorption performance of the silver-based absorbent material in a seashore region may be degraded. Also, performance of the carbon-based absorbent material may be degraded when other materials such as moisture are present in the atmosphere. The above-described methods known in the related art are effective when iodine is present in a high concentration in a closed space. However, once the iodine is released into the atmosphere and is mixed with a large amount of moisture and salt, decontamination efficiency is significantly degraded using the current capture method.

The foregoing discussion is to provide general background information, and does not constitute an admission of the prior art.

SUMMARY

One aspect of the present invention is directed to a material capable of effectively removing radioactive iodine, which is harmful to human bodies, from the atmosphere, and a system for removing radioactive iodine using the same. Absorption reactivity of a carbon-based absorbent material widely used these days is degraded when there is a lot of moisture in the air, and iodine absorption performance of a silver-based absorbent material may be degraded by chloride ions present in marine environments, and is very expensive compared to its effects, but when volatile radioactive nuclide absorbent material according to the present invention is used, it is capable to provide a method to remove radioactive iodine effectively at a low cost.

However, the problems to be solved according to the present invention are not limited to the above-described problems, and other problems which are not disclosed herein will be made apparent from the detailed description provided below by those skilled in the art.

One aspect of the invention provides an apparatus for filtering airborne radioactive iodine. The apparatus may include: a housing defining an interior space and comprising an inlet for receiving air and an outlet for discharging the air; and a composition placed in the interior space for trapping airborne radioactive iodine between the inlet and the outlet, the composition comprising one or more salts selected from the group consisting of an alkali metal chloride and an alkaline earth metal chloride.

In the foregoing apparatus, the one or more salts may be present in the form of particles. The particles may have a diameter of about 0.1 µm to about 5,000 µm. The particles may be porous. The apparatus may further comprise a filter located at each of the inlet and the outlet and configured to allow the air to pass therethrough and inhibit the particles from passing therethrough.

Still in the foregoing apparatus, the composition may comprise a solution of the one or more salts. The housing may comprise a liquid drain configured to drain an aqueous solution containing the trapped iodine. The apparatus may further comprise a heater configured to heat the one or more salts. The composition may further comprise one or more bases.

Another aspect of the invention provides an apparatus for filtering airborne radioactive iodine. The apparatus may include: a housing defining an interior space and comprising an inlet for receiving air and an outlet for discharging the air; and a composition placed in the interior space for trapping airborne radioactive iodine between the inlet and the outlet, the composition comprising a mixture of one or more salts selected from the group consisting of an alkali metal chloride and an alkaline earth metal chloride and one or more bases.

In the foregoing apparatus, the one or more salts may be present in the form of particles having a diameter of about 0.1 μm to about 5,000 μm. The one or more salts and the one or more bases may be substantially homogeneously mixed. The one or more bases are selected from the group consisting of NaOH, KOH, $NH_4OH$, $Ca(OH)_2$ and $Na_3PO_4$. The housing may comprise a liquid drain configured to drain an aqueous solution containing the trapped iodine.

Still in the foregoing apparatus, the apparatus may be located at a nuclear facility selected from the group consisting of a nuclear power plant, a nuclear fuel processing plant, a nuclear waste processing plant, and a radioactive material waste storage. The apparatus may further comprise a blower configured to blow the air to flow from the inlet to the outlet. The apparatus may further comprise a plurality of containers, each of which contains the composition.

Still another aspect of the invention provides a method of filtering airborne radioactive iodine. The method may include: providing the foregoing apparatus at a nuclear facility selected from the group consisting of a nuclear power plant, a nuclear fuel processing plant, a nuclear waste processing plant, and a radioactive material waste storage; blowing air to flow from the inlet to the outlet and contact the composition placed in the interior space, whereby airborne radioactive iodine is trapped in the interior space.

In the foregoing method, at least part of the trapped iodine may be present in an aqueous solution, wherein the method may further comprise draining the aqueous solution containing iodine from the housing. The method may further comprise heating the one or more salts so as to remove moisture from the one or more salts.

Yet another aspect of the present invention provides a volatile radioactive nuclide absorbent material including a salt which is a chloride of an alkali metal or an alkaline earth metal.

According to one exemplary embodiment of the present invention, the volatile radioactive nuclide absorbent material may be used to absorb a radioactive material abnormally leaked from a nuclear facility.

According to another exemplary embodiment of the present invention, the volatile radioactive nuclide absorbent material may absorb a volatile radioactive nuclide present in a gaseous or aerosol phase.

According to still another exemplary embodiment of the present invention, the radioactive nuclide may be iodine.

According to another exemplary embodiment of the present invention, the alkali metal may be selected from the group consisting of lithium, sodium, potassium, rubidium, cesium, and francium.

According to still another exemplary embodiment of the present invention, the alkaline earth metal may be selected from the group consisting of calcium, strontium, barium, radium, beryllium, and magnesium.

According to still another exemplary embodiment of the present invention, the salt may be selected from the group consisting of sodium chloride, calcium chloride, or potassium chloride, and may be in the form of particles having a diameter of about 0.1 μm to about 5,000 μm.

According to yet another exemplary embodiment of the present invention, the volatile radioactive nuclide absorbent material may include a pH control compound.

A further aspect of the present invention provides a system for removing radioactive iodine. Here, the system includes an absorption reactor isolated from an external atmosphere and carrying the volatile radioactive nuclide absorbent material defined in claim 1, an inlet configured to allow an external atmosphere to flow into the absorption reactor, an outlet configured to discharge the external atmosphere passed through the absorption reactor to the outside, a filter installed in the front of the outlet to prevent external leakage of a salt included in the absorbent material, a drain configured to release moisture formed in the absorption reactor to the outside, and a heater configured to induce recycling of the salt and release of the radioactive iodine.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EMBODIMENTS

Figure 1:
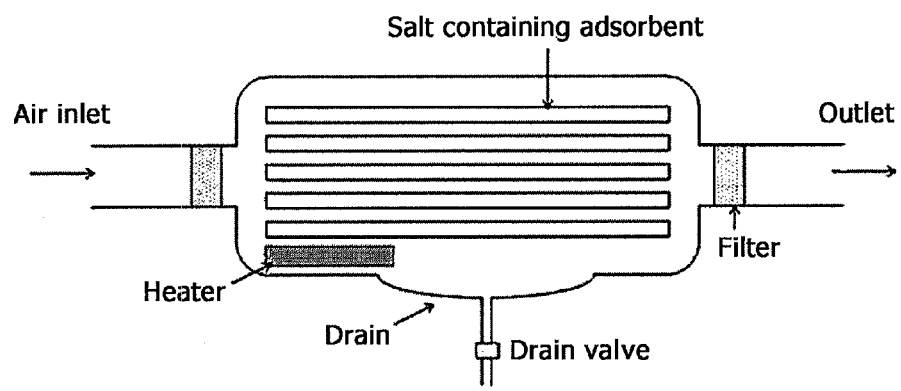
FIG. 1 is a schematic view showing a radioactive iodine removal system according to one exemplary embodiment of the present invention.

Hereinafter, embodiments of the present invention will be described in detail. However, the present invention is not limited to the embodiments disclosed below, but can be implemented in various forms. The following embodiments are described in order to enable those of ordinary skill in the art to embody and practice the present invention.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below.

Embodiments of the present invention provide a volatile radioactive nuclide absorbent material containing a salt which is a chloride of an alkali metal or an alkaline earth metal which is effective for removing gaseous radioactive iodine, and a radioactive iodine removal system using the same.

The absorption performance of the carbon-based absorbent material, which is a current representative radioactive iodine absorbent material, is degraded when there is moisture in the air, and in the case of silver-based absorbent material, the problem not only lies in the absorption performance that gets degraded by iodine, but also in the high cost. Based on the facts described above, there is an urgent demand for developing a new iodine absorbent material that may be effectively used when a large amount air contaminated by radioactive iodine is released from a nuclear facility into the atmosphere, and a radioactive iodine removal system using the same. Therefore, the present inventors have completed the invention by studying on an inexpensive volatile radioactive nuclide absorbent material that can be used to effectively remove radioactive iodine that is harmful to human bodies, in the atmosphere.

The present inventors have conducted research on a method capable of effectively absorbing a large amount of radioactive iodine, and found a radioactive iodine absorbent material containing a salt. As a result, the present inventors have developed a removal system capable of effectively capturing the radioactive iodine using the absorbent material.

When a radioactive material is abnormally leaked as cooling of a nuclear fuel in a nuclear facility is suspended, radioactive iodine may be released into the atmosphere due to its strong volatility. In this case, the volatile radioactive nuclide absorbent material according to one exemplary embodiment of the present invention may not only selectively absorb iodine in the atmosphere since the volatile radioactive nuclide absorbent material contains a salt which is a chloride of an alkali metal or an alkaline earth metal, but may also selectively absorb iodine even when the absorbent material is already combined with steam, water aerosol, etc. Therefore, the volatile radioactive nuclide absorbent material according to embodiments of the present invention, which contains a salt which is a chloride of an alkali metal or an alkaline earth metal chloride, may be used in a radioactive iodine removal system capable of effectively absorbing a volatile radioactive nuclide present in a gaseous or aerosol phase.

According to one exemplary embodiment of the present invention, the volatile radioactive nuclide absorbent material containing the salt which is the chloride of the alkali metal or the alkaline earth metal chloride possesses a function of absorbing radioactive iodine, and the salt may include at least one selected from the group consisting of chlorides of an alkali metal and/or an alkaline earth metal. In embodiments, the alkali metal may be selected from the group consisting of lithium (Li), sodium (Na), potassium (K), rubidium (Rb), cesium (Cs), and francium (Fr), and the alkaline earth metal may be selected from the group consisting of calcium (Ca), strontium (Sr), barium (Ba), radium (Ra), beryllium (Be), and magnesium (Mg), but the present invention is not particularly limited thereto. In one embodiment, the salt is sodium chloride, calcium chloride, or potassium chloride.

The iodine absorbent material containing a salt according to embodiments of the present invention may improve absorption performance by increasing the reactive surface using the salt in the form of microparticles. However, the salt is a representative chemical species causing corrosion of metals, and to reduce mobility and dispersibility of the salt, a diameter of 0.1 micrometers (μm) or more that can be controlled through a conventional filter is required. In embodiments, a salt in the form of particles having a diameter of about 0.1 μm to about 5,000 μm, but not particularly limited as long as the diameter can be controlled through the filter.

Meanwhile, iodine is present in the form of molecular iodine ($I_2$) having strong volatility rather than in the form of iodide ions ($I^-$) having high solution stability under a low pH condition, and when under the basic condition, it is present in the form of iodide ($I^-$) or iodate ($IO_3^-$) ions having high solution stability, as shown in the following Scheme 1. Therefore, a pH control compound capable of maintaining a basic pH value is added to the iodine absorbent material containing a salt according to embodiments of the present invention to effectively inhibit the absorbed iodine from being desorbed and released again.

Scheme 1

Accordingly, to improve retention stability of the iodine absorbed onto the volatile radioactive nuclide absorbent material containing a salt which is a chloride of an alkali metal or an alkaline earth metal, the apparatus in accordance with embodiments of the present invention may further include a pH control compound such as a basic material. A group of pH control compounds includes hydroxide salts, phosphates, etc., and representative pH control compounds include NaOH, KOH, $NH_4OH$, $Ca(OH)_2$, $Na_3PO_4$, etc., but the present invention is not particularly limited thereto.

The volatile radioactive nuclide absorbent material containing a salt according to one exemplary embodiment of the present invention may absorb iodine in the atmosphere using a salt (i.e., a chloride) that can be easily manufactured at a low cost, and may also be reused since the performance is maintained for a long period of time when a device capable of removing moisture by an increase in temperature is simply installed. Therefore, one embodiment of the present invention provides a system for removing radioactive iodine, which includes an absorption reactor isolated in an external atmosphere, and carrying the volatile radioactive nuclide absorbent material according to embodiments of the present invention, an inlet configured to allow an external atmosphere to flow into the absorption reactor, an outlet configured to discharge the external atmosphere passed through the absorption reactor to the outside, a filter installed in the front of the outlet to prevent external leakage of a salt included in the absorbent material, a drain configured to release moisture formed in the absorption reactor to the outside, and a heater configured to induce recycling of the salt and release of the radioactive iodine. A schematic view of the system is shown in FIG. 1. However, systems for removing radioactive iodine are not particularly limited as long as they include the volatile radioactive nuclide absorbent material according to embodiments of the present invention.

According to embodiments of the present invention, the volatile radioactive nuclide absorbent material containing a salt or the radioactive iodine removal system using it, may be installed in a nuclear power plants that have radioactive iodine leakage possibility or in an interim storage facility of spent nuclear fuel and be properly used as a main or auxiliary means that collect and remove the radioactive iodine of the inside facility.

Hereinafter, Examples are provided to aid in understanding the present invention. However, it should be understood that detailed description provided herein is merely intended to provide a better understanding of the present invention, but is not intended to limit the scope of the present invention.

EXAMPLES

Example 1

Manufacture of Experimental Device for Removing Radioactive Iodine

Figure 2:
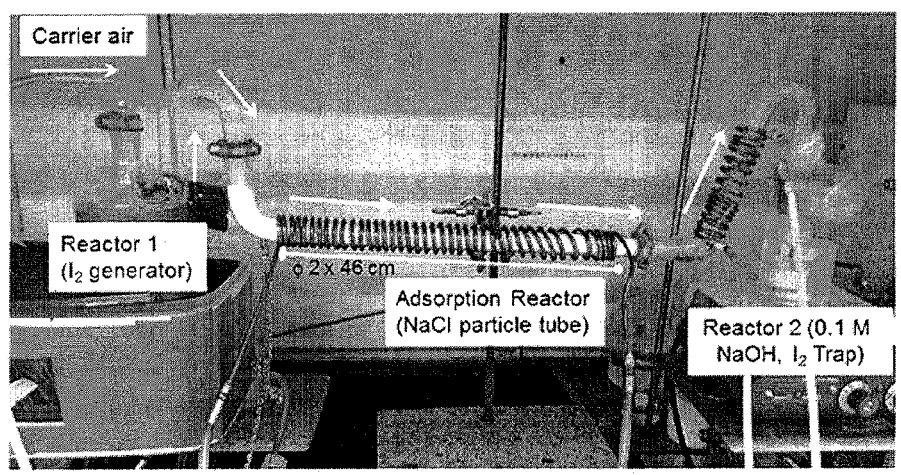
FIG. 2 is an image illustrating an experimental device for removing iodine according to one exemplary embodiment of the present invention.

To determine absorption performance of an absorbent material containing a salt, an experimental device for removing iodine was manufactured, and an image of the experimental device is shown in FIG. 2.

As shown in FIG. 2, a first reactor, which is an iodine generator, is filled with an aqueous solution in which molecular iodine ($I_2$) is dissolved. A tubular absorption reactor is charged with sodium chloride (NaCl) particles. Then, a second reactor configured to dissolve and capture iodine contained in a carrier gas is filled with a sodium hydroxide (NaOH) solution. The first reactor and the absorption reactor, and the absorption reactor and the second reactor are each connected with glass tubes, respectively, to manufacture a radioactive iodine removal experimental device.

Example 2

Determination of Absorption Performance of Absorbent Material Containing Salt To determine absorption performance of an absorbent material containing a salt, iodine absorption performance of two salts, sodium chloride and calcium chloride, was experimentally measured. For iodine generation, molecular iodine ($I_2$) was dissolved in an aqueous solution, and added to the first reactor manufactured in Example 1. Carrier air was bubbled into the first reactor at a flow rate of 2 cc per second and evaporated iodine molecules, and passed through an absorption reactor (diameter: 2 cm, and length: 46 cm) filled with a salt. Thereafter, the carrier air passed through the absorption reactor was again passed through the second reactor filed with 200 milliliters (mL) of a 0.1 M NaOH aqueous solution and dissolved the iodine contained in the carrier air in a sodium hydroxide solution. Then, an iodine content dissolved in the sodium hydroxide solution was measured using a UV/VIS spectrometer, and calculated the amount of iodine absorbed onto the absorption reactor. The absorption reactors were charged respectively with 195 grams (g) of sodium chloride (NaCl) having an average particle diameter of 0.5 millimeters (mm), and 90 g of calcium chloride ($CaCl_2$) having an average particle diameter of 0.1 mm to perform two absorption experiments. The absorption experiment results on both of the chlorides are listed in the following Table 1.

TABLE 1

| Absorbent material | Amount of injected iodine gas (mg) | Amount of passed iodine (mg) | Decontamination factor |
|---|---|---|---|
| NaCl particles | 0.423 | *Not detected | ∞ |
| $CaCl_2$ particles | 0.134 | *Not detected | ∞ |

*Not detected: A detection limit is 0.012 mg as measured using a UV/VIS spectroscopic method As listed in Table 1, when a certain amount of iodine was passed through the absorption reactor together with air, the iodine species was completely absorbed to both of the absorbent materials, and no iodine species was detected in the carrier air passed through the absorption reactor. From these results, it was confirmed that by using alkali metal such as sodium chloride, or an alkaline earth metal chloride such as calcium chloride, radioactive iodine in the atmosphere can be easily collected. Moreover, it is easily inferred that when a reaction cross section is increased using porous absorbent material or form the absorption reactor in multi-step, an iodine absorption capacity can be further increased.

Example 3

Determination of Improvement of Iodine Solubility by Addition of Sodium Chloride A liquid may be formed in an environment in which an absorbent acts due to a hygroscopic characteristic of a salt under a high moisture condition. To evaluate an absorption characteristic of iodine under a high humidity condition, solubility of iodine was measured in a solution in which the salt was dissolved.

Figure 3:
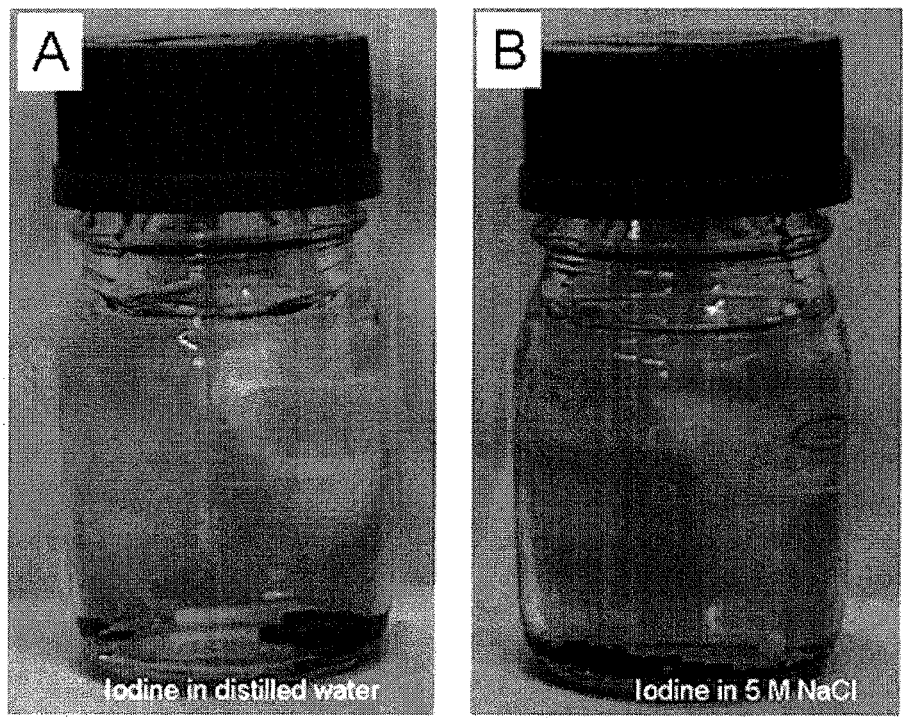
FIG. 3 is an image illustrating the results obtained by comparing solubility of iodine in distilled water and a 5 M sodium chloride solution after solid iodine is added to the distilled water and the 5 M sodium chloride solution.

FIG. 3 is an image illustrating solubility phenomenon comparison after 1 minute since the solid iodine ($I_2$) was added into each distilled water and 5 M sodium chloride solution. Dissolution of iodine was not initiated in the distilled water (FIG. 3A), but the iodine was rapidly dissolved in the sodium chloride solution (FIG. 3B), which was easily observed from a change in color. Also, when the iodine was dissolved in 100 mL of a solution of 5 M sodium chloride at 25° C., it was observed that the solubility was increased to 0.13 g, which was approximately 4.5 times higher than the solubility (0.029 g) in distilled water, as listed in Table 2. This indicates that the iodine forms a stable chemical species in a sodium chloride solution. Therefore, it could be identified that not only a salt in a solid phase, but also a solution in which the salt is dissolved can stably capture iodine.

TABLE 2

| Test solution (100 ml) | Amount of dissolved iodine at 25° C. (g) | Reported solubility at 25° C. (g/100 mL) |
|---|---|---|
| Distilled water | 0.032 | 0.029 |
| 5M NaCl | 0.130 | — |

From the results, it could also be identified that a radioactive iodine removal system as shown in FIG. 1 can be manufactured using the absorbent material containing a salt according to embodiments of the present invention. When a filter is installed at an inlet and an outlet of an absorption reactor to prevent an absorbent material including a salt from flowing out, and when a large amount of moisture is included in the atmosphere inflow, the iodine dissolved in moisture could be collected in the form of a solution from a lower portion of the absorption reactor. In this case, the iodine dissolved in an aqueous solution is ionized into a soluble chemical species by chloride ions included in the solution, and can be stably dissolved in the solution, and additionally adds a pH control agent in the absorbent material to be more stably presented in the aqueous solution. In addition, since the radioactive iodine has a short half-life of 8 days, the iodine absorbent material containing a salt could be repeatedly reused when several weeks pass after saturation, and the moisture is removed, and after the absorbent material is dried using a built-in heater. Moreover, a gamma-ray spectrometer can be further installed inside or outside of the absorption reactor to drain moisture collected at a lower portion of the absorption reactor, or sense the period for reuse.

According to embodiments of the present invention, the volatile radioactive nuclide absorbent material containing a salt or the radioactive iodine removal system using it, has advantages of absorption functions to selectively absorb iodine in the atmosphere, and is inexpensive compared to a silver-based absorbent material. The salt can selectively absorb gaseous iodine, and even when an iodine species is present in steam or water aerosol phases, due to the hygroscopicity of the salt, an aerosol can be effectively captured, and due to this characteristic, when the radioactive iodine is present in a gaseous phase, it can be absorbed and the salt can be properly used to remove the radioactive iodine in the atmosphere. Therefore, one embodiment of the present invention is expected to be installed in a nuclear power plants that have radioactive iodine leakage possibility or in an interim storage facility of spent nuclear fuel and be vitally used as a main or auxiliary means that collect and remove the radioactive iodine of the inside facility.

While embodiments of the invention have been shown and described with reference to certain exemplary embodiments thereof, it will be understood by those skilled in the art that various changes in form and details may be made therein without departing from the scope of the invention as defined by the appended claims.

What is claimed is:

1. A nuclear facility comprising:
   a source of airborne radioactive iodine; and
   an apparatus for filtering airborne radioactive iodine from the source, the apparatus comprising:
   a housing defining an interior space and comprising an inlet for receiving air and an outlet for discharging the air; and
   a composition placed in the interior space for trapping airborne radioactive iodine between the inlet and the outlet, the composition comprising one or more salts selected from the group consisting of an alkali metal chloride and an alkaline earth metal chloride.

2. The nuclear facility of claim 1, wherein the one or more salts are present in the form of particles, wherein the nuclear facility is selected from the group consisting of a nuclear power plant, a nuclear fuel processing plant, a nuclear waste processing plant, and a radioactive material waste storage.

3. The nuclear facility of claim 2, wherein the particles have a diameter of about 0.1 μm to about 5,000 μm.

4. The nuclear facility of claim 2, wherein the particles are porous.

5. The nuclear facility of claim 2, further comprising a filter located at each of the inlet and the outlet and configured to allow the air to pass therethrough and inhibit the particles from passing therethrough.

6. The nuclear facility of claim 1, wherein the composition comprises a solution of the one or more salts.

7. The nuclear facility of claim 1, wherein the housing comprises a liquid drain configured to drain an aqueous solution containing the trapped iodine.

8. The nuclear facility of claim 1, further comprising a heater configured to heat the one or more salts.

9. The nuclear facility of claim 1, wherein the composition further comprises one or more bases.

10. A nuclear facility comprising:
    a source of airborne radioactive iodine; and
    an apparatus for filtering airborne radioactive iodine from the source, the apparatus comprising:
    a housing defining an interior space and comprising an inlet for receiving air and an outlet for discharging the air; and
    a composition placed in the interior space for trapping airborne radioactive iodine between the inlet and the outlet, the composition comprising a mixture of one or more salts selected from the group consisting of an alkali metal chloride and an alkaline earth metal chloride and one or more bases.

11. The nuclear facility of claim 10, wherein the one or more salts are present in the form of particles having a diameter of about 0.1 μm to about 5,000 μm, wherein the nuclear facility is selected from the group consisting of a nuclear power plant, a nuclear fuel processing plant, a nuclear waste processing plant, and a radioactive material waste storage.

12. The nuclear facility of claim 10, wherein the one or more salts and the one or more bases are substantially homogeneously mixed.

13. The nuclear facility of claim 10, wherein the one or more bases are selected from the group consisting of NaOH, KOH, $NH_4OH$, $Ca(OH)_2$ and $Na_3PO_4$.

14. The nuclear facility of claim 10, wherein the housing comprises a liquid drain configured to drain an aqueous solution containing the trapped iodine.

15. The nuclear facility of claim 10, wherein the apparatus is located at a nuclear facility selected from the group consisting of a nuclear power plant, a nuclear fuel processing plant, a nuclear waste processing plant, and a radioactive material waste storage.

16. The nuclear facility of claim 10, further comprising a blower configured to blow the air to flow from the inlet to the outlet.

17. The nuclear facility of claim 10, further comprising a plurality of containers, each of which contains the composition.

18. A method of filtering airborne radioactive iodine, the method comprising:
    providing the nuclear facility of claim 10 by placing the apparatus nearby the source of airborne radio iodine, wherein the at a nuclear facility is selected from the group consisting of a nuclear power plant, a nuclear fuel processing plant, a nuclear waste processing plant, and a radioactive material waste storage; and
    blowing air to flow from the inlet to the outlet and contact the composition placed in the interior space, whereby airborne radioactive iodine is trapped in the interior space.

19. The method of claim 18, wherein at least part of the trapped iodine is in present in an aqueous solution, wherein the method further comprises draining the aqueous solution containing iodine from the housing.

20. The method of claim 18, further comprising heating the one or more salts so as to remove moisture from the one or more salts.

* * * * *